United States Patent [19]
Tracy

[11] Patent Number: 5,920,991
[45] Date of Patent: Jul. 13, 1999

[54] DEVICE AND METHOD FOR REMOVING DOUGH FROM BAKED GOODS

[75] Inventor: Anthony S. Tracy, 404 E. 55th St. Apt. 8H, New York, N.Y. 10022

[73] Assignees: Anthony S. Tracy, New York, N.Y.; Elaine Ginsberg, W. Orange, N.J.

[21] Appl. No.: 08/900,314

[22] Filed: Jul. 25, 1997

[51] Int. Cl.$^6$ .................................................. B26B 3/00
[52] U.S. Cl. ................................ 30/280; 30/294; 30/314; 30/342; 30/278
[58] Field of Search ............................. 30/280, 294, 316, 30/317, 293, 340, 342, 278; D07/393

[56] References Cited

U.S. PATENT DOCUMENTS

| | | | |
|---|---|---|---|
| D. 362,588 | 9/1995 | Cohen et al. ............................. | D7/393 |
| 644,732 | 3/1900 | Crandall . | |
| 1,991,267 | 2/1935 | Waldron et al. ......................... | 146/203 |
| 2,032,562 | 3/1936 | Burns ..................................... | 30/278 X |
| 2,266,209 | 12/1941 | Jones ........................................ | 30/280 |
| 2,447,301 | 8/1948 | Wright .................................... | 30/283 X |
| 3,892,039 | 7/1975 | Fisher .................................... | 30/280 X |
| 4,345,516 | 8/1982 | Sinclair ................................. | 30/316 X |
| 4,383,367 | 5/1983 | Mielnicki .............................. | 30/280 X |
| 4,571,832 | 2/1986 | Hendy et al. ............................ | 30/280 |
| 4,979,419 | 12/1990 | Sonkin .................................... | 83/875 |
| 5,033,193 | 7/1991 | Valenti .................................... | 30/124 |
| 5,557,998 | 9/1996 | Schwartz et al. ........................ | 83/875 |
| 5,613,431 | 3/1997 | Tateno ................................... | 30/302 X |

*Primary Examiner*—Rinaldi I. Rada
*Assistant Examiner*—T. Anthony Vaughn
*Attorney, Agent, or Firm*—David L. Davis

[57] ABSTRACT

A device for removing dough from a piece of baked goods includes a handle and a blade having a cutting edge secured to the handle. The blade is contoured to define an open region between the blade and the handle so that dough removed from the piece of baked goods can pass through the open region between the blade and the handle.

9 Claims, 4 Drawing Sheets

DEVICE AND METHOD FOR REMOVING DOUGH FROM BAKED GOODS

BACKGROUND OF THE INVENTION

This invention relates generally to a device and method for treating baked goods and, more particularly, to such a device and method which are particularly useful for removing dough from the interior of a previously cut piece of baked goods, such as a bagel or a roll.

There are numerous circumstances in which a person desires to remove dough from the interior of a piece of baked goods, such as a bagel or a roll. For example, the person may be on a diet and wishes to reduce the amount of dough which is eaten. Also, when making a sandwich, the person may wish to provide a hollow receptacle for soft sandwich filling, such as tuna salad. It is known to remove the excess dough by scooping it out with one's fingers. However, when preparing the bagel or roll for another person, such as a guest in one's home or a customer of a commercial food establishment, using one's fingers is considered impolite and unsanitary. It would therefore be desirable to provide a device for removing dough from a piece of baked goods, which device does not require a person's hands touching the dough and which device is readily cleaned.

SUMMARY OF THE INVENTION

The present invention is a device for removing dough from a piece of baked goods and comprises a handle and a blade. The handle includes an elongated body portion extending between first and second ends. The blade has a cutting edge which extends between first and second ends of the blade. The blade is secured at its first and second ends to the handle body portion first end and is contoured to define an open region between the blade and the handle. Accordingly, dough is removed from the piece of baked goods by moving the device so that the blade passes through the dough cutting edge first, with the removed dough passing through the open region between the blade and the handle.

In accordance with an aspect of this invention, the blade is contoured as a circular arc.

In accordance with another aspect of this invention, the handle includes a T-shaped extension having a stem and a cross bar at the first end of the body portion and the ends of the blade are secured to respective opposite ends of the cross bar.

Thus, a method for removing dough from a piece of baked goods in accordance with this invention comprises the steps of providing a device including a handle and a blade having a cutting edge extending between first and second ends of the blade, wherein the blade is secured at its ends to the handle and is contoured to define an open region between the blade and the handle. The piece of baked goods is cut substantially along a plane to expose interior dough of the piece of baked goods. The device is then moved so that the cutting edge of the blade cuts into the exposed interior dough to cause dough to be removed from a piece of baked goods and pass through the open region between the blade and the handle of the device.

BRIEF DESCRIPTION OF THE DRAWINGS

The foregoing will be more readily apparent upon reading the following description in which like elements in different figures thereof are identified by the same reference numeral and wherein.

DETAILED DESCRIPTION

Figure 1:
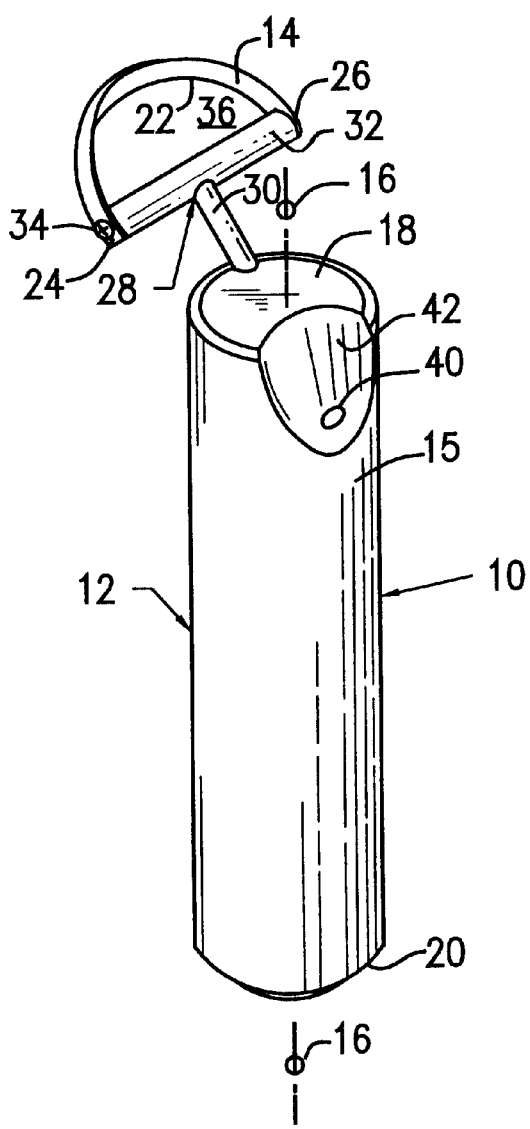
FIG. 1 is a perspective view of a device constructed in accordance with the principles of this invention.

As shown in the drawings, the inventive device, designated generally by the reference numeral 10, includes a handle 12 and a blade 14. The handle 12 includes an elongated body portion 15 defining a major longitudinal axis 16 between a first end 18 and a second end 20 of the body portion 15.

The blade 14 is secured to the first end 18 of the handle 12 body portion 15. The blade 14 has a cutting edge 22 extending between the first end 24 and the second end 26 of the blade 14. In the embodiment shown in FIG. 1, the handle 12 includes a T-shaped extension 28 having a stem 30 and a cross bar 32 at the body portion 15 first end 18. The ends 24, 26 of the blade 14 are secured to respective opposite ends of the cross bar 32, as by screws 34 or the like. When secured to the cross bar 32, the blade 14 is contoured to define an open region 36 between the blade 14 and the handle 12. Illustratively, as shown in FIG. 1, the blade 14 is contoured as a circular arc and the open region 36 is between the blade 14 and the cross bar 32.

Figure 2:
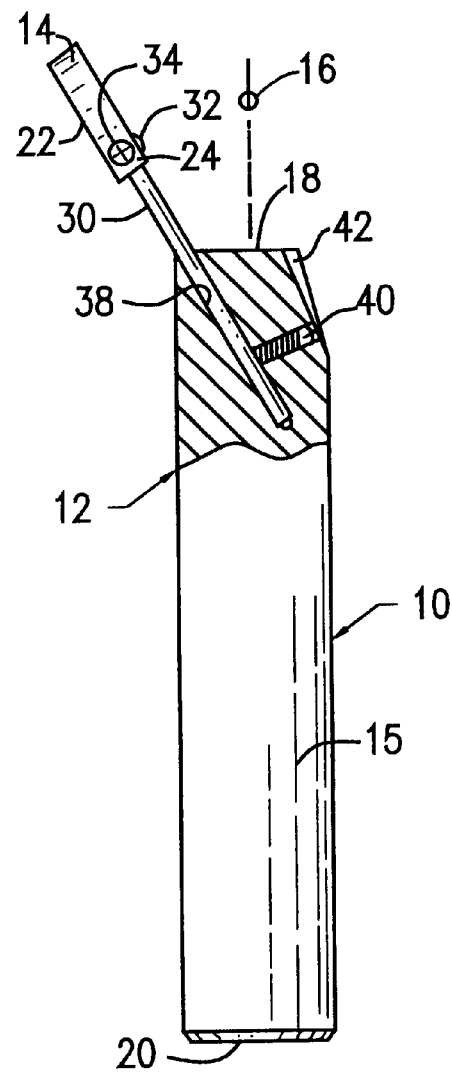
FIG. 2 is a partially sectioned side view of the inventive device.

It has been found that improved results in use of the device are attained when the blade 14 is angularly offset from the major longitudinal axis 16, as best shown in FIG. 2. In particular, a plane defined by the stem 30 and the cross bar 32 of the extension 28 is at an acute angle to the axis 16. It is preferred that this acute angle be in the range from about 10° to about 40°, most preferably at approximately 30°.

To secure the extension 28 to the body portion 15 of the handle 12, the main body portion is formed with a bore 38 extending from the end 18 into the body portion 15 at the desired angle to the axis 16. The diameter of the bore 38 relative to the diameter of the stem 30 is such that the stem 30 is inserted into the bore 38 with virtually no clearance. A set screw 40 is then utilized to secure the stem 30 to the body portion 15 of the handle 12.

It has been found that improved results are attained by providing a concave region 42 at the first end 18 of the body portion 15 of the handle 12. This concave region 42 should be centered opposite the blade 14 and is adapted to receive a finger of a user to assist the user in applying pressure and guiding the device 10 when it is in use.

Figure 3:
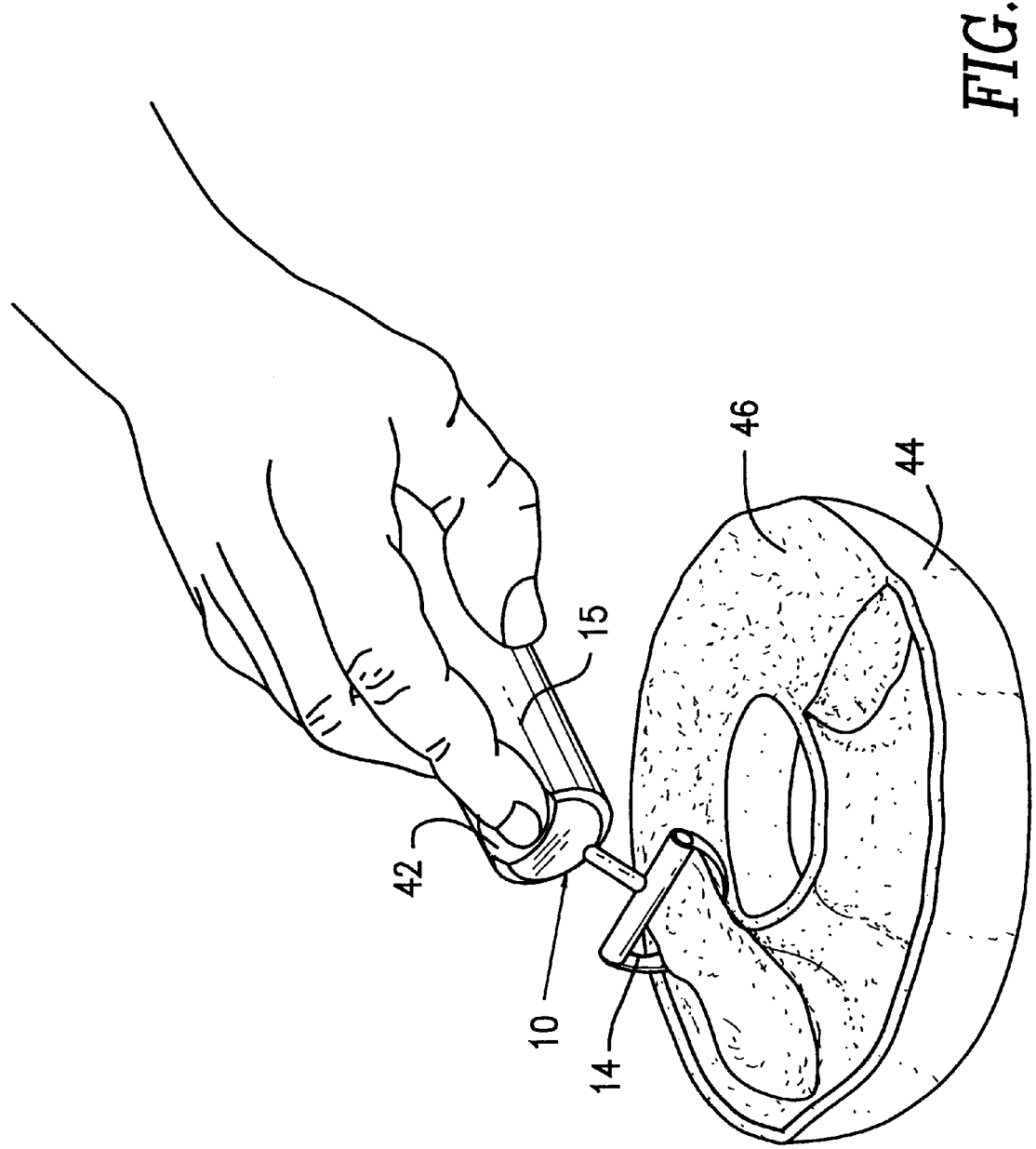
FIG. 3 illustrates the use of the inventive device for removing dough from a bagel.

In order to remove dough from a piece of baked goods, the user initially cuts the piece of baked goods substantially along a plane to expose the interior dough of the piece of baked goods. FIG. 3 illustrates a bagel 44 which has been so cut. The user then grips the body portion 15 of the handle 12 and places his index finger in the concave region 42. The device 10 is then moved so that the cutting edge 22 of the blade 14 cuts into the exposed interior dough 46 of the bagel 44. The dough which has been cut away passes through the open region 36 between the blade 14 and the handle 12. After going completely around the bagel 44, the loose dough is easily removed. The user can choose how much dough is removed by controlling the depth to which the blade 14 is inserted into the dough.

Figure 4:
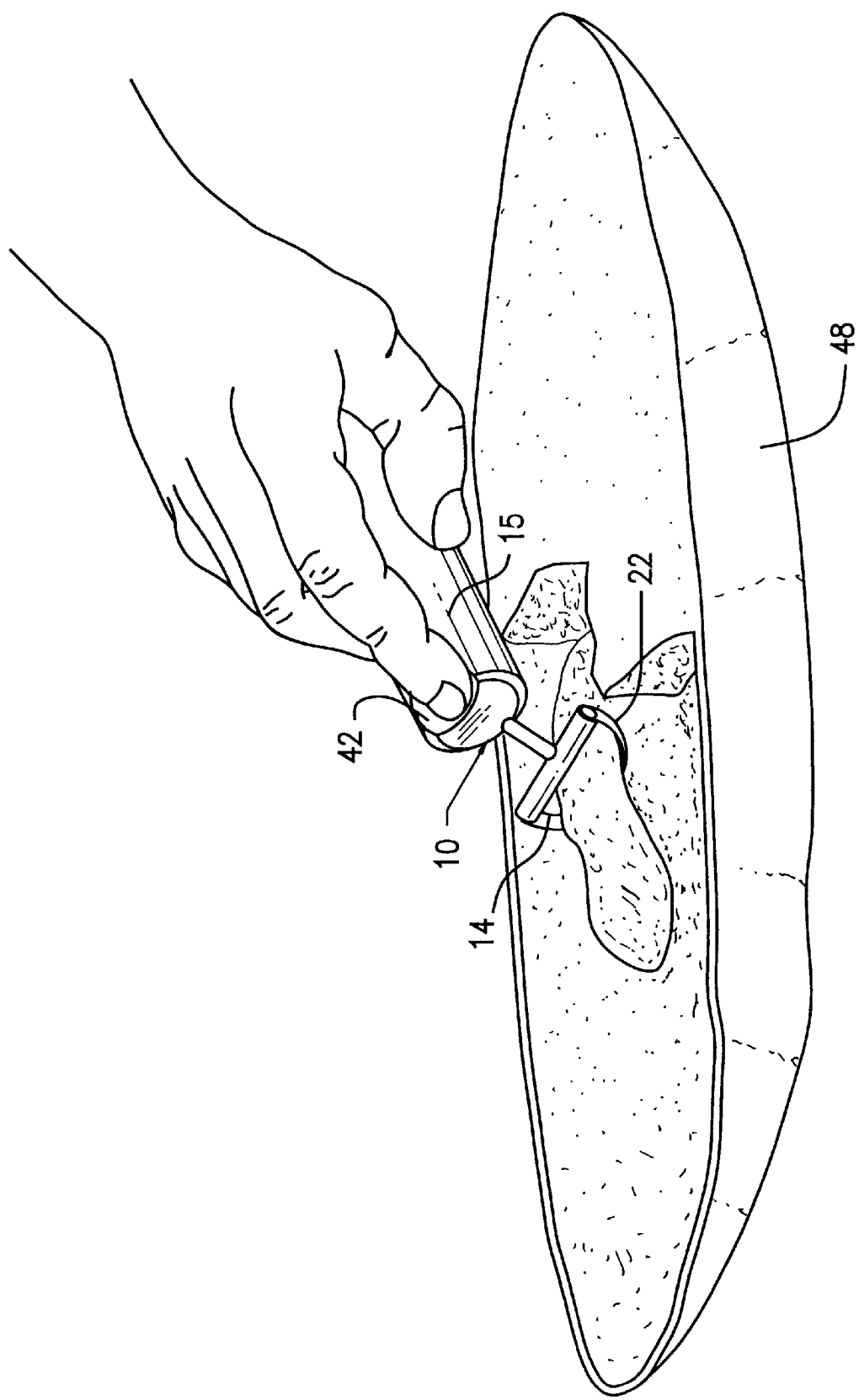
FIG. 4 illustrates the use of the inventive device for removing dough from a roll.

The device 10 is not limited to removing dough from a bagel. As shown in FIG. 4, the device 10 can be utilized in the same way to remove dough from a piece of baked goods such as an elongated sub roll 48. This is accomplished by removing parallel strips of dough from the roll 48. The device 10 can be constructed with a larger blade 14 designed specifically for the size of the roll 48 so that the interior dough can be removed in a single pass of the device 10.

Figure 5:
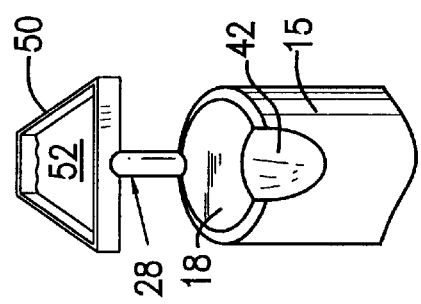
FIGS. 5–10 illustrate alternate embodiments of the inventive device.
Figure 6:
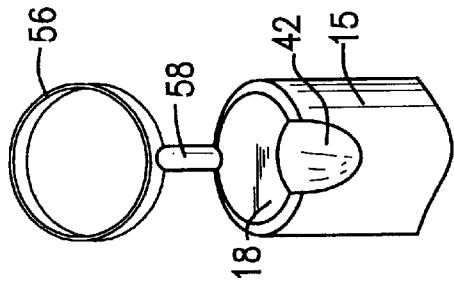
Figure 7:
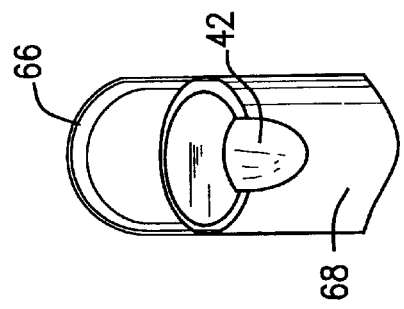
Figure 8:
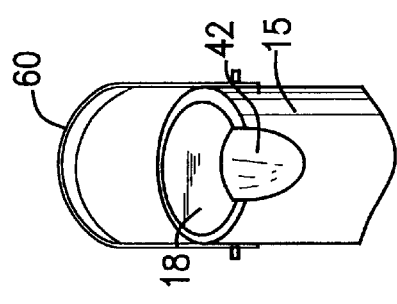
Figure 9:
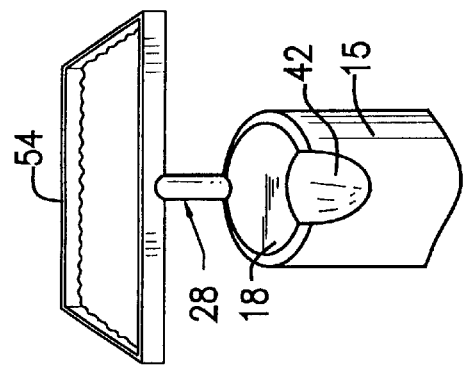
Figure 10:
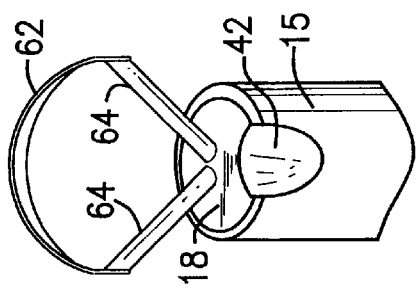

FIGS. 5–10 illustrate other embodiments of the present invention. As shown in FIG. 5, the blade 50 is contoured so that the open region 52 is trapezoidal. FIG. 6 shows an embodiment similar to FIG. 5 with a larger trapezoid 54. FIG. 7 illustrates an embodiment with a circular blade 56 mounted to a stem 58. FIG. 8 shows an embodiment where the ends of the blade 60 are directly secured to the body portion 15 of the handle 12. FIG. 9 shows an embodiment where the ends of the blade 62 are secured to a pair of stems 64. FIG. 10 shows an embodiment where the blade 66 and the handle 68 are formed as a unitary structure, preferably molded from a hard plastic such as an acrylic.

For most applications, the blade can have a straight cutting edge. However, it is contemplated that there may be situations, as for commercial use as opposed to household use, where the cutting edge is serrated, as shown in FIGS. 5 and 6, to effect a closer scraping of interior dough from the outer crust of the piece of baked goods.

In all of the embodiments, it is preferred that the material used for forming the blade and the handle be such that it is washable, preferably dishwasher safe, for sanitary reasons.

Accordingly, there have been disclosed an improved device and method for removing dough from a piece of baked goods. While several illustrative embodiments of the present invention have been disclosed herein, it will be apparent to one of skill in the art that various modifications to the disclosed embodiments are possible and it is intended that this invention be limited only by the scope of the appended claims.

What is claimed is:

1. A device for removing dough from a piece of baked goods comprising:

a handle including an elongated body portion extending between first and second ends and a T-shaped extension having a stem and a cross bar at said body portion first end, said body portion first end being formed with a concave region adapted to receive a finger of a user to assist the user in applying pressure an guiding the device; and a blade having a cutting edge extending between first and second ends of said blade, said blade being secured at said first and second blade ends to respective opposite ends of said cross bar and contoured to define an open region between said blade and said cross bar, wherein said blade is unattached other than at said first and second blade ends and said cross bar is attached only to said blade so that said open region is unobstructed between said blade and said cross bar;

whereby dough is removed from said piece of baked goods by moving said blade through said dough cutting edge first, with the removed dough passing through said open region between said blade and said cross bar.

2. The device according to claim 1 wherein said blade is contoured as a circular arc.

3. The device according to claim 1 wherein said blade is contoured so that said open region is trapezoidal.

4. The device according to claim 1 wherein said blade is curved in a circular arc between its first and second ends.

5. The device according to claim 1 wherein said elongated body portion of said handle defines a major longitudinal axis and a plane defined by the stem and cross bar of said extension is at an acute angle to said major longitudinal axis.

6. The device according to claim 5 wherein said acute angle is in the range from about 10° to about 40°.

7. The device according to claim 6 wherein said acute angle is approximately 30°.

8. The device according to claim 1 wherein said handle and said blade are formed as a unitary structure.

9. The device according to claim 1 wherein said cutting edge is serrated.

\* \* \* \* \*